United States Patent
Sekine et al.

(10) Patent No.: US 11,872,722 B2
(45) Date of Patent: Jan. 16, 2024

(54) PREFORM SHAPING METHOD AND COMPOSITE FORMING METHOD

(71) Applicant: SUBARU CORPORATION, Tokyo (JP)

(72) Inventors: Naoyuki Sekine, Tokyo (JP); Yuta Inoue, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 171 days.

(21) Appl. No.: 16/420,641

(22) Filed: May 23, 2019

(65) Prior Publication Data

US 2020/0070385 A1 Mar. 5, 2020

(30) Foreign Application Priority Data

Aug. 28, 2018 (JP) .................................. 2018-159800

(51) Int. Cl.
*B29B 11/16* (2006.01)
*B29C 70/48* (2006.01)
*B29C 70/54* (2006.01)

(52) U.S. Cl.
CPC .............. *B29B 11/16* (2013.01); *B29C 70/48* (2013.01); *B29C 70/541* (2013.01)

(58) Field of Classification Search
CPC ........ B29B 11/16; B29C 70/48; B29C 70/541
USPC ....................................................... 264/257
See application file for complete search history.

(56) References Cited

U.S. PATENT DOCUMENTS

| 4,762,740 A * | 8/1988 | Johnson .................. B29C 33/76 |
| | | 428/68 |
| 8,993,084 B2 * | 3/2015 | Griess ..................... B29C 66/14 |
| | | 428/60 |
| 2003/0132543 A1 | 7/2003 | Gardner |
| 2004/0134593 A1 | 7/2004 | Ishibashi et al. |
| 2005/0042410 A1 | 2/2005 | Sakonjo et al. |
| 2006/0048890 A1 | 3/2006 | Sato et al. |
| 2008/0220112 A1 | 9/2008 | Waldrop et al. |
| 2010/0080952 A1 | 4/2010 | Suzuki et al. |
| 2010/0181017 A1 | 7/2010 | Shinoda et al. |
| 2010/0285265 A1 | 11/2010 | Shinoda et al. |
| 2010/0316837 A1 | 12/2010 | Packer et al. |

(Continued)

FOREIGN PATENT DOCUMENTS

| EP | 2 233 625 A1 | 9/2010 |
| EP | 2 639 047 A1 | 9/2013 |

(Continued)

OTHER PUBLICATIONS

English Translation of Ryuzo (JP2010150685A) (Year: 2010).*

(Continued)

*Primary Examiner* — Matthew J Daniels
*Assistant Examiner* — Hana C Page
(74) *Attorney, Agent, or Firm* — MCGINN I.P. LAW GROUP, PLLC

(57) ABSTRACT

In a preform shaping method, a fiber stack is manufactured by stacking a sheet-form fibrous component, at least one of a subsidiary material and a component part that have flexibility is placed on the fiber sack, and a preform that has a shaped configuration is manufactured by pressing and pressurizing, against a mold, the fiber stack provided with the at least one of the subsidiary material or the component part.

11 Claims, 6 Drawing Sheets

(56) References Cited

U.S. PATENT DOCUMENTS

| | | | |
|---|---|---|---|
| 2011/0086199 A1 | 4/2011 | Duqueine et al. | |
| 2011/0104432 A1 | 5/2011 | Duqueine et al. | |
| 2011/0121487 A1* | 5/2011 | Topping | B29C 70/48 |
| | | | 264/258 |
| 2013/0233474 A1 | 9/2013 | De Mattia | |
| 2013/0240150 A1 | 9/2013 | Suzuki et al. | |
| 2014/0147620 A1 | 5/2014 | Li et al. | |
| 2015/0377217 A1* | 12/2015 | Sandercock | B29C 70/72 |
| | | | 416/230 |
| 2016/0355962 A1* | 12/2016 | Adolphs | D04H 1/74 |
| 2017/0072647 A1 | 3/2017 | Perrillat et al. | |
| 2019/0176412 A1* | 6/2019 | Maeda | B29C 43/3642 |

FOREIGN PATENT DOCUMENTS

| | | | | |
|---|---|---|---|---|
| EP | 2805802 A1 * | 11/2014 | | B29B 11/06 |
| EP | 3 023 241 A1 | 5/2016 | | |
| FR | 2 928 294 A1 | 9/2009 | | |
| JP | 2004-276393 A | 10/2004 | | |
| JP | 2005-153680 A | 6/2005 | | |
| JP | 2006-069166 A | 3/2006 | | |
| JP | 2007-260925 A | 10/2007 | | |
| JP | 2008-230020 A | 10/2008 | | |
| JP | 2009-166279 A | 7/2009 | | |
| JP | 2009-191092 A | 8/2009 | | |
| JP | 2010-150685 A | 7/2010 | | |
| JP | 2013-216012 A | 10/2013 | | |
| WO | WO 2005/071152 A1 | 8/2005 | | |
| WO | WO 2008/090911 A1 | 7/2008 | | |
| WO | WO 2015/156861 A2 | 10/2015 | | |

OTHER PUBLICATIONS

NIshiyama (English Translation of JP4965296B2) (Year: 2007).*
Goren ("Manufacturing of polymer matrix composites using vacuum assisted resin infusion molding," Archives of Materials Science and Engineering, vol. 24, Issue 2, Dec. 2008) (Year: 2008).*
English Translation of Collart (FR3022177) (Year: 2014).*
Extended European Search Report dated Jan. 2, 2020 for European Patent Application No. 19176101.4-1019.
Extended European Search Report dated Jan. 2, 2020 for European Patent Application No. 19176335.8-1019.
United States Office Action dated Feb. 13, 2023, in co-pending U.S. Appl. No. 16/420,682.
Japanese Office Action, dated May 31, 2022, in Japanese Application No. 2018-173065 and English Translation thereof.
United States Office Action dated Jul. 24, 2023, in co-pending U.S. Appl. No. 16/420,682.
Japanese Office Action dated Apr. 12, 2022, in corresponding Japanese Patent Application No. 2018-159800, with an English translation thereof.
Communication Pursuant to Article 94(3) EPC dated Feb. 17, 2022, in corresponding European Patent Application No. 19 176 101.4-1017.
Chinese Office Action dated Feb. 22, 2022, in corresponding Chinese Patent Application No. 20191041815.3., with an English translation thereof.

* cited by examiner

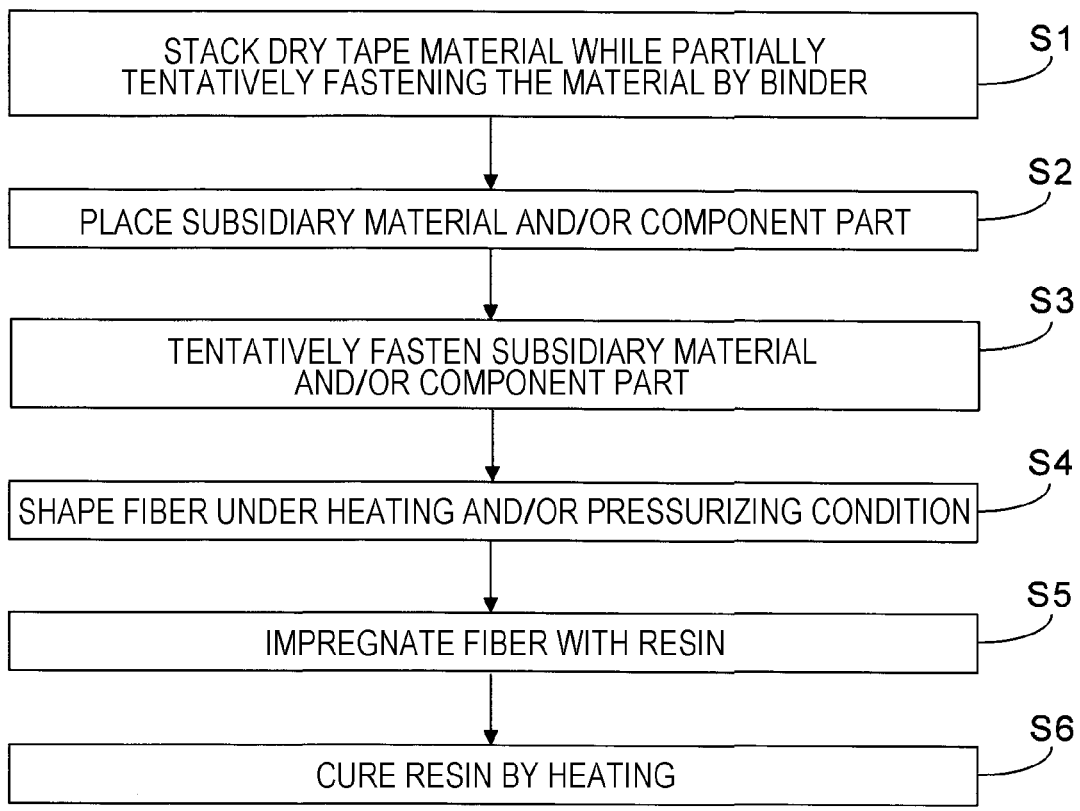

PREFORM SHAPING METHOD AND COMPOSITE FORMING METHOD

CROSS-REFERENCE TO RELATED APPLICATIONS

The present application claims priority from Japanese Patent Application No. 2018-159800 filed on Aug. 28, 2018, the entire contents of which are hereby incorporated by reference.

BACKGROUND

The disclosure relates to a preform shaping method and a composite forming method.

An RTM (resin transfer molding) method has been known as one of composite forming methods for composites whose resin components have been reinforced with fibers, such as glass fiber reinforced plastics (GFRPs) and carbon fiber reinforced plastics (CFRPs).

The RTM method is a molding method for a composite in which sheet-form fibrous components are stacked, the stack is impregnated with a thermosetting resin, and then the resin is thermally cured. Of various RTM methods, a method in which fiber is impregnated with resin by vacuuming is called a vacuum-assisted resin transfer molding (VaRTM) method and a method in which impregnation with resin is carried out by using a die is called a matched-die RTM method.

In the case where a composite is molded by the RTM method, a dry preform is manufactured prior to resin impregnation (see, for example, Japanese Unexamined Patent Application Publication No. 2010-150685). The dry preform is a material obtained by shaping a stack of sheet-form fibrous components in accordance with the configuration of a composite that has been molded. A tape-form fibrous base material for use in manufacturing a dry preform is called a dry tape material. Techniques for manufacturing a dry preform by using a dry tape material include a technique in which after dry tape materials are stacked on a flat planar stacking jig, the dry tape material stack is shaped into a product configuration by placing the stack on a die and pressing the stack against the die while heating.

In the case where a composite is molded by the RTM method, a dry preform having been subjected to shaping (i.e., a shaped dry preform) is impregnated with resin. In conjunction with this step, a technology in which a mesh-form flow medium is mounted in order to facilitate impregnation of a dry preform with resin and a technology in which a flow medium is prevented from being consolidated with resin at the time of curing the resin by interposing a peel ply therebetween (see, for example, Japanese Unexamined Patent Application Publication No. 2007-260925) are known. The flow medium is formed from polypropylene, polyethylene, etc., and is disposed to form space that becomes a resin flow path when vacuuming is performed. The peel ply is a woven fabric made of a fiber of nylon, polyester, etc.

SUMMARY

An aspect of the disclosure provides a preform shaping method that includes manufacturing a fiber stack by stacking a sheet-form fibrous component, placing on the fiber stack at least one of a subsidiary material or a component part that have flexibility, and manufacturing a preform that has a shaped configuration by pressing and pressurizing, against a mold, the fiber stack provided with the at least one of the subsidiary material or the component part.

An aspect of the disclosure provides a composite forming method that includes manufacturing a composite by impregnating the preform manufactured by the above preform shaping method with a resin and curing the resin.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 1 is a flowchart illustrating a procedure of a composite forming method that includes a preform shaping method according to an embodiment of the disclosure;

DETAILED DESCRIPTION

Figure 2A:
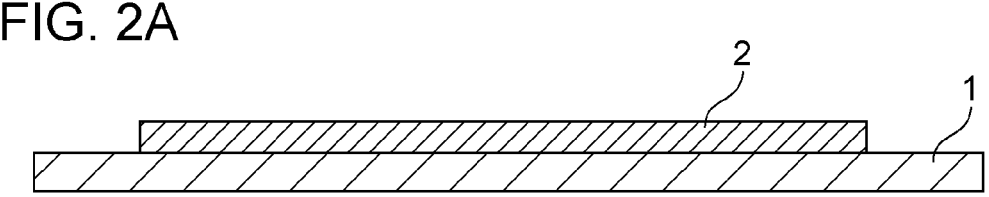
FIGS. 2A, 2B, and 2C are diagrams illustrating a method for shaping a preform by bagging.

In the following, some embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. When a dry preform has a complicated configuration, it requires an amount of labor to stably place and fix a subsidiary material, such as a flow medium or a peel ply, onto a surface of the dry preform. Particularly when the configuration of a dry preform is complicated, it is not easy to place and fix a subsidiary material at an appropriate position on the dry preform.

Therefore, it is desirable to facilitate the operation of placing a subsidiary material or the like on a surface of a dry preform when a composite is to be formed by an RTM method such as a VaRTM method or a matched-die RTM method.

Figure 2B:
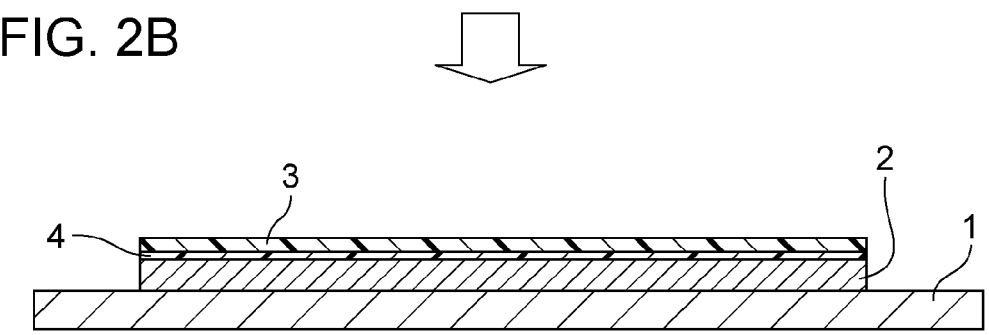
Figure 2C:
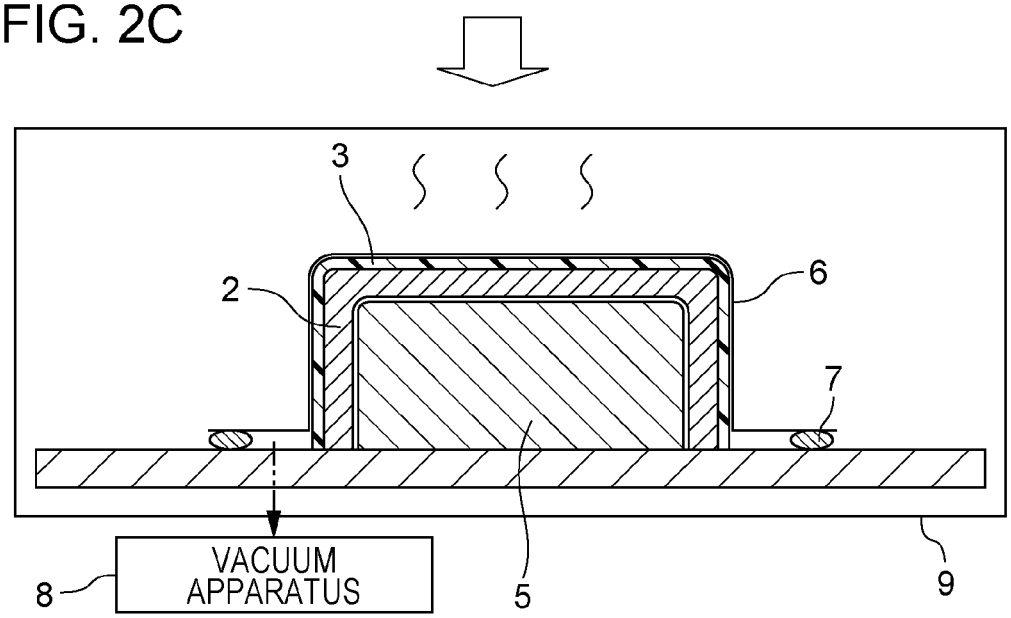
Figure 3A:
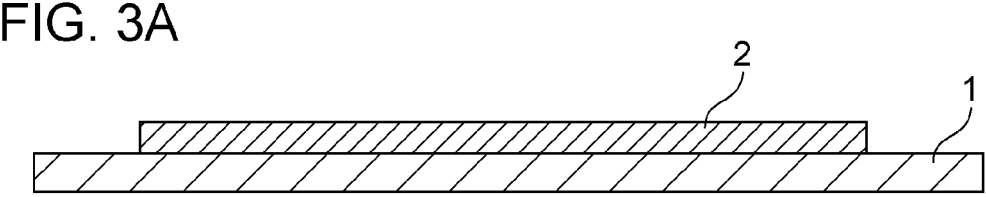
FIGS. 3A, 3B, and 3C are diagrams illustrating a method for shaping a preform by pressing against a mold.
Figure 3B:
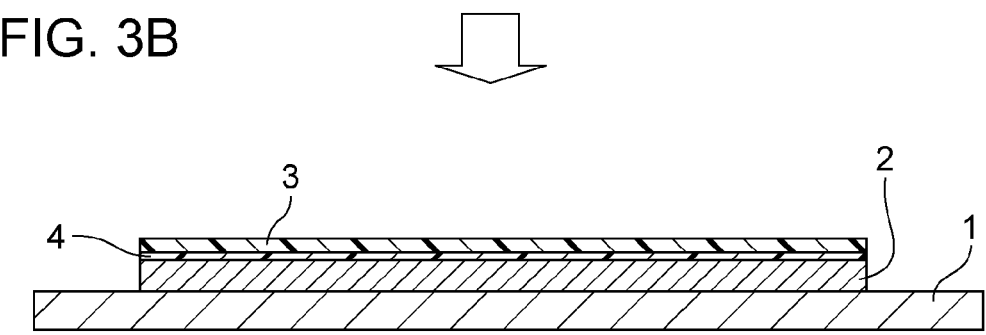
Figure 3C:
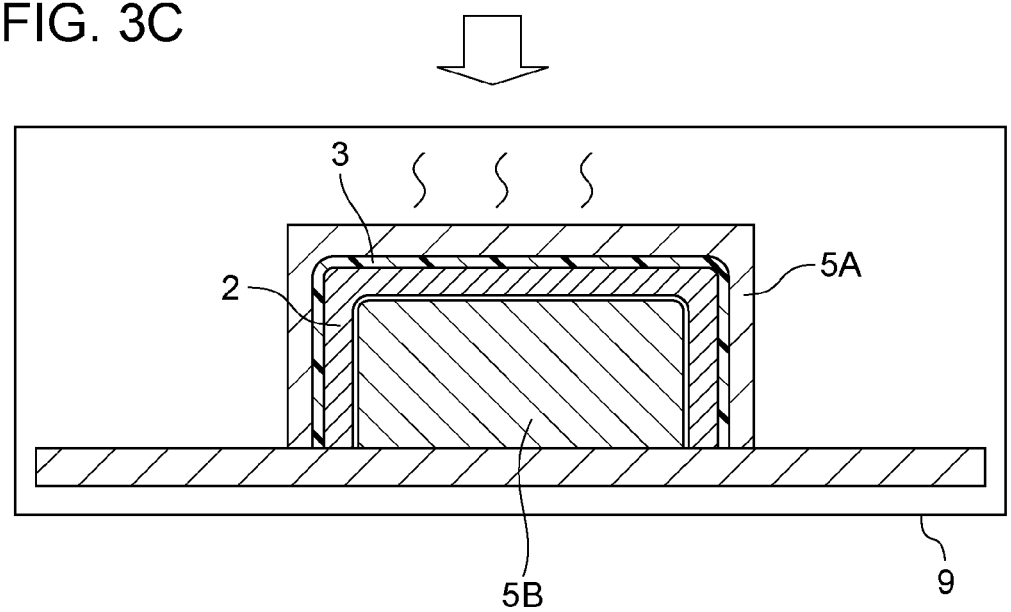

FIG. 1 is a flowchart illustrating a procedure of a composite forming method that includes a preform shaping method according to an embodiment of the disclosure. FIGS. 2A, 2B, and 2C illustrate a method for shaping a preform by bagging. FIGS. 3A, 3B, and 3C illustrate a method for shaping a preform by pressing against a mold.

The preform is a raw material for a fiber reinforced plastic (FRP) obtained by reinforcing resin with fiber such as CFRPs and GFRPs. The FRP is also called a composite. Of the preforms, preforms that are yet to be impregnated with resin are called dry preforms.

FIG. 1 illustrates a method in which a dry preform is manufactured and the manufactured dry preform is used as a raw material to form a composite by an RTM method. On the other hand, FIGS. 2A, 2B, and 2C and FIGS. 3A, 3B, and 3C illustrate manufacturing methods for a dry preform that is to be used as a material of a composite. Incidentally, the RTM method is a molding method for a composite in which fibrous components are stacked, the stack is then shaped in accordance with the configuration of the composite, the shaped stack is impregnated with an uncured resin, and then the resin is thermally cured.

First, in step S1 illustrated in FIG. 1, sheet-form fibrous components are stacked on a flat platy stacking jig 1 as illustrated in FIG. 2A and FIG. 3A. As a result, a stack 2 of fibrous components (referred to also as "fiber stack 2") is manufactured. A tape-form fiber has been productized under the name of dry tape material.

In particular, a sheet-form fibrous component made of a combination of a binder and a fiber in the form of tape is commercially sold as a dry tape material. Therefore, if a dry tape material in which a binder has been attached is used to manufacture a stack 2 of fiber, it becomes possible to stack dry tape materials with the binder partially achieving tentative fastening so as not to allow the sliding between materials.

Examples of the binder include a thermoplastic binder and a thermosetting binder. Sheet-form fibrous components to which a sheet-form, net-form, nonwoven fabric-form, or powder-form thermoplastic binder has been attached, sheet-form fibrous components, such as dry tape materials, in which a powder-form or liquid-state thermosetting binder has been attached, among other sheet-form fibrous components have been productized.

Figure 4:
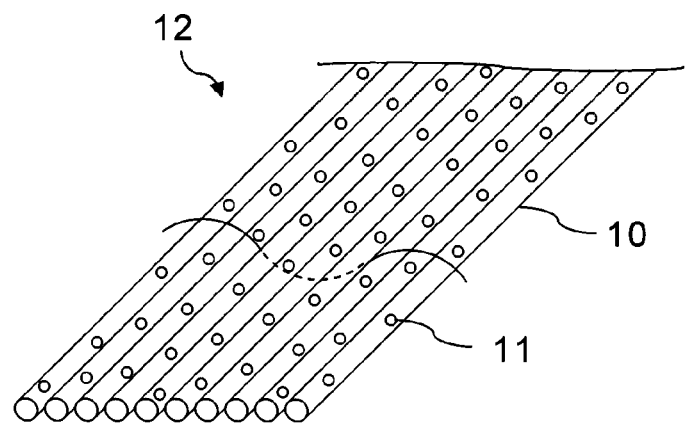
FIG. 4 is a perspective view illustrating a structure of a dry tape material in which fine particles of a thermoplastic resin as a thermoplastic binder have been attached to fiber.

FIG. 4 is a perspective view illustrating a structure of a dry tape material in which fine particles of a thermoplastic resin have been attached as a thermoplastic binder to the fiber.

A dry tape material 12 in which a fiber bundle 10 bundled in a sheet form has been coated with fine particles 11 of a thermoplastic resin as a thermoplastic binder, as illustrated in FIG. 4 is commercially sold.

Figure 5:
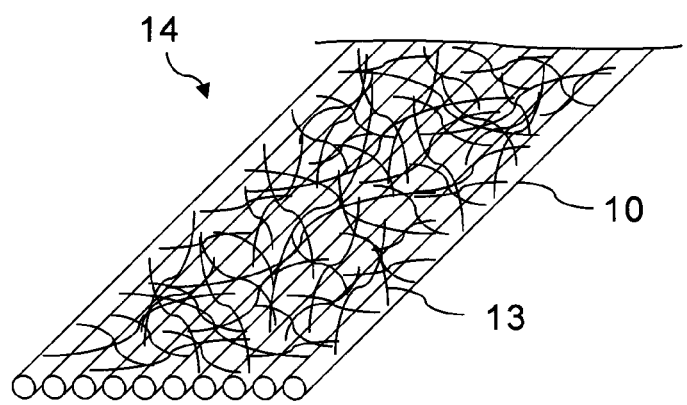
FIG. 5 is a perspective view illustrating a structure of a dry tape material in which a thermoplastic nonwoven fabric as a thermoplastic binder has been attached to fiber.

FIG. 5 is a perspective view illustrating a structure of a dry tape material in which a thermoplastic nonwoven fabric has been attached as a thermoplastic binder to fiber.

A dry tape material 14 in which a thermoplastic nonwoven fabric 13 has been superimposed as a thermoplastic binder on a fiber bundle 10 bundled in a sheet form as illustrated in FIG. 5 is also commercially sold.

Therefore, sheet-form fibrous components with a desired binder attached as illustrated as examples in FIG. 4 and FIG. 5 can be stacked while the fibrous components are tentatively fastened by local heating. Of course, in the case where tentative fastening is not carried out, sheet-form fibrous components without an attached binder may be stacked. The tentative fastening and the stacking of sheet-form fibrous components may be carried out either automatically by using an automatic fiber stacking apparatus equipped with a heater for performing spot welding of the binder or manually by an operator.

As a concrete example, in the case where dry tape materials with an attached thermoplastic binder are stacked on a flat platy stacking jig 1 while the dry tape materials are tentatively fastened, the thermoplastic binder can be thermally fused to each dry tape material at constant intervals by locally heating the thermoplastic binder through the use of an automatic fiber stacking apparatus equipped with a heater. Therefore, dry tape materials that each constitutes a fiber layer can be stacked while each tape material is tentatively fastened to the dry tape material that is adjacent in the stacking direction in the manner of multi-spot fastening with the thermoplastic binder.

Next, in step S2, an object 3 that has flexibility, such as a subsidiary material or a component part, is placed on the fiber stack 2 as illustrated in FIG. 2B and FIG. 3B. Specifically, at least one of a subsidiary material or a component part is mounted as the object 3 on the fiber stack 2. Examples of the subsidiary material include a flow medium and a peel ply. Therefore, at least one of a flow medium or a peel ply can be mounted on the fiber stack 2. On the other hand, examples of the component part include a copper mesh for lightning protection.

The flow medium is a mesh-form sheet that is provided between a surface of a dry preform and a bagging film so that fiber is sufficiently impregnated with resin even by vacuuming alone in the VaRTM method. The flow medium is made of a material that has flexibility, such as polypropylene or polyethylene. The provision of a flow medium will form a space between the bagging film and the surface of the dry preform. Therefore, flow paths of resin are formed, facilitating penetration of resin into the fiber that forms the dry preform. As a result, the resin can be allowed to permeate throughout the fiber while retaining flexibility, so that the resin impregnation can be completed.

The peel ply is a woven fabric for bettering the adhesion property of a surface of a composite that is formed from a dry preform used as a material. The peel ply is a sheet made of a fiber of nylon, polyester, etc.

It is often the case that a typical object 3, such as a subsidiary material or a component part, is in a sheet form, a mesh-form, or a string-form. Therefore, the object 3 can be stacked substantially in the same manner as a sheet-form fibrous component and can be pressurized and shaped together with the fiber stack 2.

Next, in step S3, the subsidiary material or the component part is tentatively fastened to the fiber stack 2, if necessary, as a pre-process that precedes the pressurization for shaping. Specifically, in the case where sheet-form fibrous components that include a binder have been stacked, the binder attached to the sheet-form fibrous components can be used to tentatively fasten the object 3, such as a subsidiary material or a component part, to the fiber stack 2. That is, the object 3, such as a subsidiary material or a component part, can also be stacked on the fiber stack 2 while being tentatively fastened to the fiber stack 2 with the binder, in substantially the same manner as the sheet-form fibrous components.

Furthermore, in order to tentatively fasten the object 3, such as a subsidiary material or a component part, with a sufficient strength, a binder 4 can be additionally provided so that the object 3, such as a subsidiary material or a component part, can be tentatively fastened to the fiber stack 2 with a sufficient strength, if the binder attached to the sheet-form fibrous components is not sufficient to provide the sufficient strength. FIG. 2B and FIG. 3B illustrate examples in which a sheet-form binder 4 has been additionally provided between the fiber stack 2 and the object 3 such as a subsidiary material or a component part. Concrete examples of the sheet-form binder 4 include a woven fabric material with a knitted fiber made of a thermoplastic resin and a nonwoven fabric formed from a fiber made of a thermoplastic resin.

As a concrete example, when the binder 4 is a thermoplastic binder, the object 3, such as a subsidiary material or a component part, can also be fixed to the fiber stack 2 by thermally fusing the thermoplastic binder at equidistantly spaced spots through the use of a heater, substantially in the same manner as the sheet-form fibrous components. The tentatively fastening of the object 3 can also be carried out either automatically by using a heating terminal of the heater provided on the automatic fiber stacking apparatus or manually by an operator.

Furthermore, the binder 4 for tentatively fastening the object 3, such as a subsidiary material or a component part, can also be used when sheet-form fibrous components without an attached binder are stacked. In that case, only the object 3, such as a subsidiary material or a component part, is tentatively fastened to the fiber stack 2 by the binder 4.

Next, in step S4, the fiber stack 2 on which the object 3, such as a subsidiary material or a component part, is shaped. Therefore, a dry preform can be manufactured as a fiber stack 2 that has a shaped configuration. The shaping is carried out by pressing and pressurizing the fiber stack 2 with a mounted object 3, such as a subsidiary material or a component part, against a mold.

In the case where a dry preform is shaped by bagging, the dry preform can be manufactured by bagging the fiber stack 2 with the mounted object 3, such as a subsidiary material or a component part, and pressing the fiber stack 2 against a lower mold 5 by the atmospheric pressure, as illustrated in FIG. 2C.

More concretely, as illustrated in FIG. 2C, the object 3 and the fiber stack 2 are placed on the lower mold 5 and covered with a bagging film 6, and an edge of the bagging film 6 is stuck to the lower mold 5 by a sealant 7 so that the object 3 and the fiber stack 2 are tightly sealed.

Next, the region tightly sealed by the bagging film 6 can be depressurized by a vacuum apparatus 8. Incidentally, the vacuum apparatus 8 may be connected to the bagging film 6 via a vacuum hose or may also be connected to the lower mold 5. The vacuuming by the vacuum apparatus 8 will load the object 3 and the fiber stack 2 with a difference pressure between the atmospheric pressure and the pressure within the region tightly sealed by the bagging film 6. That is, the bagging of the object 3 and the fiber stack 2 with the bagging film 6 allows the object 3 and the fiber stack 2 to be pressurized. Therefore, a dry preform with an attached object 3 can be obtained in the form of the fiber stack 2 shaped together with the object 3 such as a subsidiary material or a component part.

Furthermore, in the case where a binder has been attached to a sheet-form fibrous component, heating during pressurization allows the binder to maintain the shaped configuration of the dry preform. Moreover, the object 3, such as a subsidiary material or a component part, can be attached to the dry preform by the binder attached to the fiber or the added binder 4. As a concrete example, in the case where a thermoplastic binder is used as the binder, the object 3, such as a subsidiary material or a component part, can be fixed to a dry preform made up of a shaped fiber stack 2, by thermal fusion brought about by heating the thermoplastic binder during pressurization.

In the case where a thermoplastic binder is used, the thermoplastic binder may be fused by, for example, a heater 9 provided within the lower mold 5. Of course, the object 3 and the fiber stack 2 that have been bagged may be sent together with the lower mold 5 into an independent heater 9 such as an oven.

As illustrated in FIG. 3C, a dry preform can also be manufactured by clamping and pressurizing a fiber stack 2 provided with a mounted object 3, such as a subsidiary material or a component part, between an upper mold 5A and a lower mold 5B.

More concretely, as illustrated in FIG. 3C, the object 3 and the fiber stack 2 are clamped and pressurized by the upper mold 5A and the lower mold 5B that have recesses whose configurations match the shaped configuration of the dry preform provided with the attached object 3 such as a subsidiary material or a component part. Therefore, a dry preform with an attached object 3 can be obtained as the fiber stack 2 shaped together with the object 3 such as a subsidiary material or a component part.

Even in the case where the object 3 and the fiber stack 2 are clamped by the upper mold 5A and the lower mold 5B, the shaping of a dry preform provided with a thermoplastic binder requires that the object 3 and the fiber stack 2 be heated to a temperature at which the binder melts. Therefore, for example, the heater 9 may be provided within at least one of the upper mold 5A or the lower mold 5B in order to melt the thermoplastic binder. Of course, it is also permissible that the object 3 and the fiber stack 2 be sent, together with the upper mold 5A and the lower mold 5B, into an independent heater 9 such as an oven.

When a dry preform with an attached object 3, such as a subsidiary material or a component part, has been manufactured by the foregoing preform shaping method, a composite can be manufactured by impregnating the dry preform with a resin and curing the resin. Concretely, in step S5, the fiber that forms the dry preform is impregnated with a resin. Next, in step S6, the resin is thermally cured. Thus, a composite is formed. That is, a composite having a targeted configuration can be manufactured.

Figure 6:
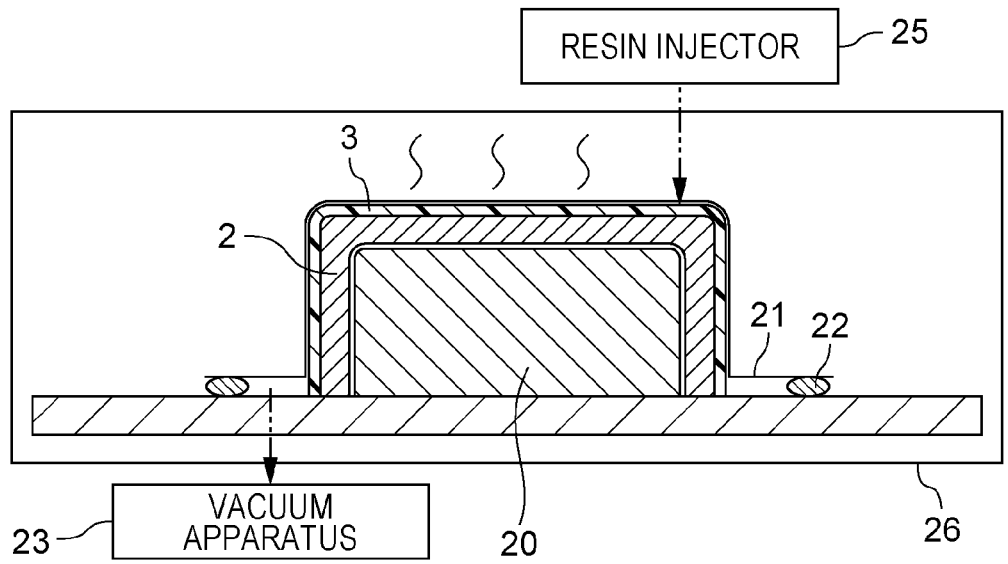
FIG. 6 is a diagram illustrating a method for molding a composite by a VaRTM method.
Figure 7:
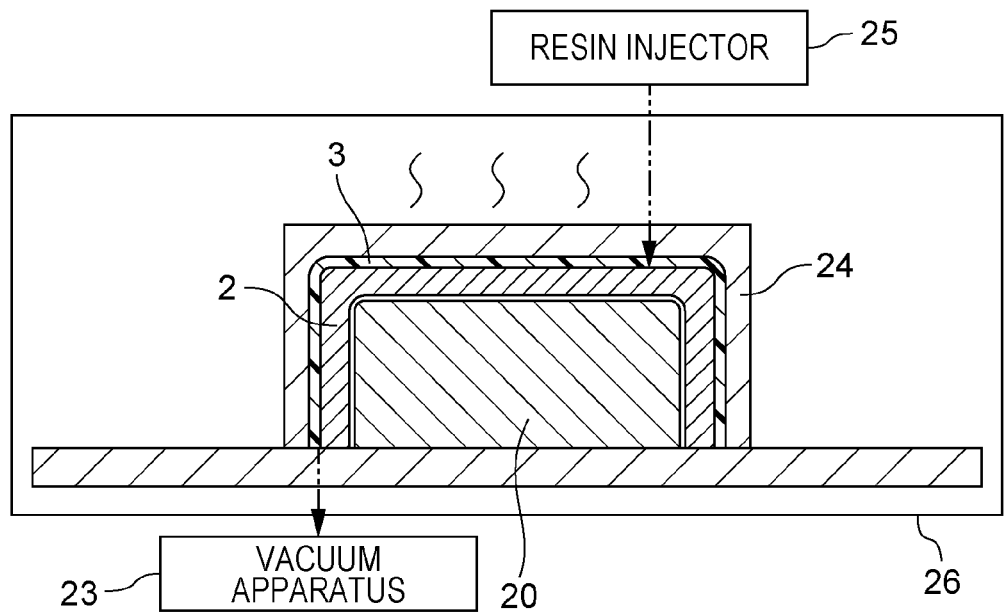
FIG. 7 is a diagram illustrating a method for molding a composite by a matched-die RTM method.

FIG. 6 illustrates a method for molding a composite by a VaRTM method. FIG. 7 illustrates a method for molding a composite by a matched-die RTM method.

When the VaRTM method is used to mold a composite, a shaped fiber stack 2 with an attached object 3, such as a subsidiary material or a component part, that is, a dry preform provided with an object 3, is mounted on a lower mold 20 for molding the composite as illustrated in FIG. 6. The lower mold 20 may be the same as the lower mold 5 illustrated as an example in FIG. 2C or may also be a separate mold dedicated to molding a composite. When the lower mold 20 for molding a composite is the same as the lower mold 5 for shaping a dry preform, other apparatuses and installations can also be commonized.

After that, the object 3 and the shaped fiber stack 2 placed on the lower mold 20 are covered with a bagging film 21 and an edge of the bagging film 21 is stuck to the lower mold 20 by a sealant 22. Then, the region tightly sealed by the bagging film 21 is depressurized by a vacuum apparatus 23. Specifically, the vacuuming by the vacuum apparatus 23 carries out the bagging of the object 3 and the shaped fiber stack 2.

When the matched-die RTM method is used to mold a composite, a shaped fiber stack 2 with an attached object 3, such as a subsidiary material or a component part, that is, a dry preform provided with an object 3, is disposed in a space formed between a lower mold 20 and a upper mold 24 that are provided for molding a composite, as illustrated in FIG. 7. Then, the space formed between the lower mold 20 and the upper mold 24 is vacuumed by a vacuum apparatus 23.

After the vacuuming is completed, a resin is injected from a resin injector 25 in both the case where the bagging film 21 is used for bagging as illustrated in FIG. 6 and the case where the upper mold 24 is used as illustrated in FIG. 7. Specifically, the resin is injected from the resin injector 25 into a region covered with the bagging film 21 or a region between the lower mold 20 and the upper mold 24. Thus, the shaped fiber stack 2 provided with the object 3, such as a subsidiary material or a component part, can be impregnated with the resin.

In particular, as illustrated in FIG. 6, if a shaped fiber stack 2 with a flow medium attached as an object 3 is impregnated with a resin when bagged by the bagging film 21, the resin impregnation can be facilitated and formation of a void can be avoided.

Furthermore, the resin is heated by the resin injector 25, if necessary, so that the resin acquires a fluidity. Still further, in the case where the resin in a heated condition is injected, the resin may be heated by a heater provided within the lower mold 20 so that the temperature of the resin does not drop. In the case where a heater is provided within the lower mold 20, the lower mold 20 may be provided, for example, with a built-in piping through which a heated fluid, such as heated steam, hot air, or hot water, flows. Alternatively, an electrical heater may be provided within the lower mold 20. Furthermore, in the case where the upper mold 24 is used as illustrated in FIG. 7, the upper mold 24 may also be provided with a built-in heater.

Next, the resin with which the shaped fiber stack 2 is impregnated is subjected to thermal curing. Concretely, the resin is heated by the heater 26 as illustrated in FIG. 6 or 7 to a temperature at which the resin cures. The heater 26 may be the same as the heater provided within the lower mold 20 or the upper mold 24 or may also be a separate heater such as an oven, as mentioned above. When the resin is heated to the curing temperature, the resin cures, so that a molded composite is manufactured.

Incidentally, although the examples described above with reference to FIG. 6 and FIG. 7 are examples in which a matrix resin that forms a composite is a thermosetting resin, the matrix resin may also be a thermoplastic resin. In the case where the matrix resin is a thermoplastic resin, known production methods for a composite whose matrix resin is a thermoplastic resin can be used to manufacture a composite.

After the composite is manufactured, unnecessary subsidiary materials, such as a flow medium, are removed from the composite and discarded. On the other hand, subsidiary materials that continue to be used, such as a peel ply, remain attached to the composite and is provided together therewith for the next step. Furthermore, a component part, if any, remains attached to the composite.

Figure 8:
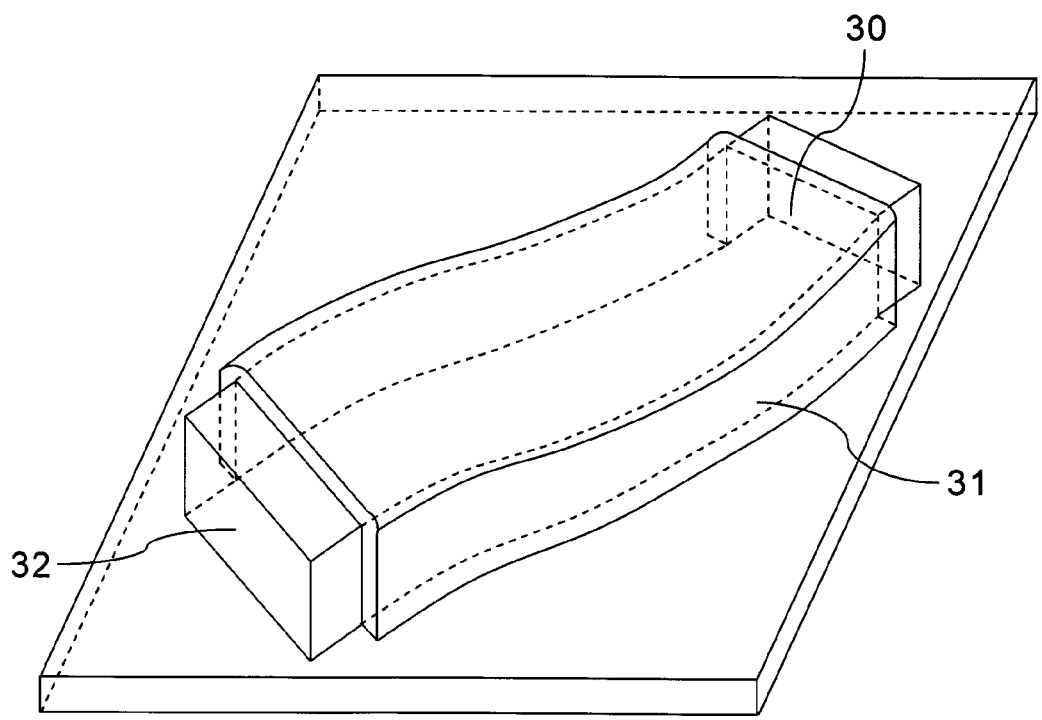
FIG. 8 is a perspective view illustrating a first example of the configurations of a dry preform and a composite that are objects to be manufactured by the preform shaping method and the composite forming method illustrated in FIG. 1.

FIG. 8 is a perspective view illustrating a first example of the configurations of a dry preform and a composite that are objects to be manufactured by the preform shaping method and the composite forming method illustrated in FIG. 1.

As illustrated in FIG. 8, for example, a dry preform and a composite in which a web 30 has on a side thereof two curved flanges 31 can be manufactured. In this case, the dry preform and the composite can be manufactured by using a mold 32 that has a protrusion on a flat plate.

Figure 9:
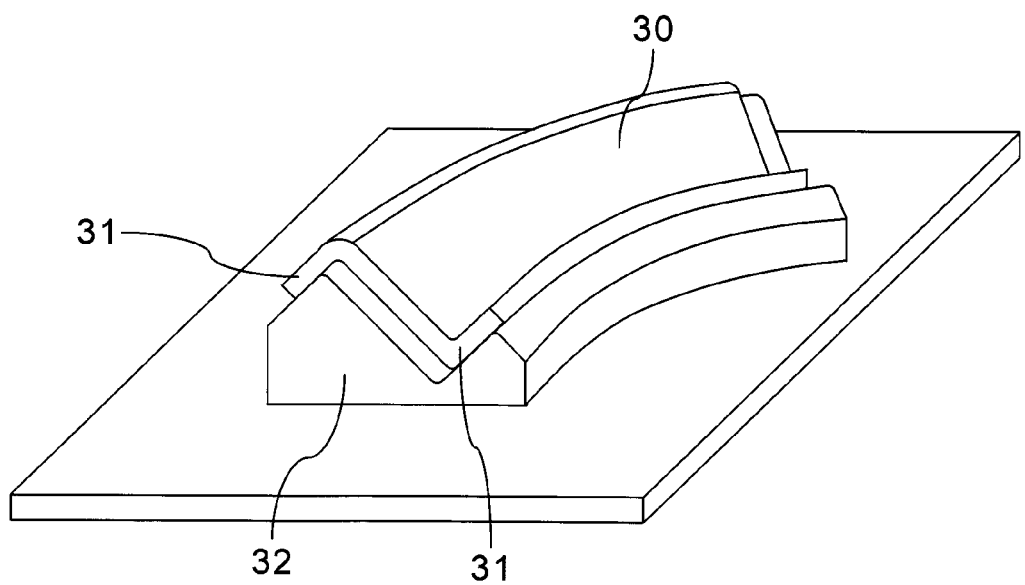
FIG. 9 is a perspective view illustrating a second example of the configurations of a dry preform and a composite that are objects to be manufactured by the preform shaping method and the composite forming method illustrated in FIG. 1.

FIG. 9 is a perspective view illustrating a second example of the configurations of a dry preform and a composite that are objects to be manufactured by the preform shaping method and the composite forming method illustrated in FIG. 1.

As illustrated in FIG. 9, for example, a dry preform and a composite in which a web 30 has on its both sides two curved flanges 31 can be manufactured. In that case, too, the dry preform and the composite can be manufactured by using a mold 32 that has a protrusion on a flat plate.

Incidentally, instead of being stacked on the stacking jig 1 whose surface is a flat surface as in FIG. 2A or FIG. 3A, a flat sheet-form fibrous component may be stacked on a lower mold 5 for shaping a dry preform as illustrated in FIG. 2C or a lower mold 5B for shaping a dry preform as illustrated in FIG. 3C. However, in the case where the tentative fastening of the fiber by spot-fashion local heating is carried out automatically by a heater, if flat sheet-form fibrous components are stacked on a stacking jig 1 whose surface is a flat surface as illustrated in FIG. 2A or FIG. 3A, the structure and control of the heater can be simplified and therefore automatization of the tentative fastening will become easy.

Furthermore, in the case where a sheet-form fibrous component is stacked on a mold for shaping a dry preform, such as the lower mold 5 as illustrated in FIG. 2C or the lower mold 5B as illustrated in FIG. 3C, layers of fiber may be bent along the edge of the mold one layer at a time as the layers of fiber are stacked. However, if the bending of the fiber is carried out after the fiber components are stacked, the number of times of bending the fiber becomes one for each bend line, leading to a reduction in the amount of operation.

The preform shaping methods and the composite forming methods as described above are designed so that when a dry preform is to be shaped, a subsidiary material, such as a flow medium, and a component part, such as a copper mesh, are mounted on a fiber stack and shaped together. Furthermore, the foregoing methods are designed so that a subsidiary material, such as a flow medium, and a component part, such as a copper mesh, can be fixed to a fiber stack by a binder over a period between before and after the shaping of the dry preform.

Advantageous Effects

Therefore, the preform shaping methods and the composite forming methods can mold subsidiary materials, such as a flow medium, and component parts, such as a copper mesh, in accordance with the configuration of a dry preform. Furthermore, the methods allow subsidiary materials, such as a flow medium, and component parts, such as a copper mesh, to be fixed to the dry preform by a binder.

Therefore, a subsidiary material, such as a flow medium, and a component part, such as a copper mesh, can be easily mounted on and fixed to an appropriate position on a dry preform. As a result, it becomes possible to reduce the labor and time required for the molding of a composite which includes operations of mounting a subsidiary material, such as a flow medium, and/or a component part, such as a copper mesh.

Furthermore, even in the case where a shaped dry preform has a complicated configuration, it is possible to mount a subsidiary material and a component part. In other words, it becomes possible to design and manufacture a composite that has a more complicated configuration.

OTHER EMBODIMENTS

While specific embodiments of the disclosure have been described above, it is to be noted that the foregoing embodiments are merely illustrative and do not limit the scope of the disclosure. The novel methods and apparatuses described herein can also be embodied in various modes other than those described above. The modes of the methods and apparatuses described herein can be subjected to various changes and modifications, including omissions and replacements in various manners, without departing from the gist of the disclosure. It is to be understood that what are described in the appended claims and their equivalents are encompassed in the scope and gist of the disclosure and include various modes and modifications.

The invention claimed is:

1. A dry preform shaping method comprising:
    forming a stack, the forming the stack including:
        forming a fiber stack by stacking sheet-form fibrous components to each of which a first binder is attached while tentatively fastening the sheet-form fibrous components with the first binder;
        stacking an electrically conductive mesh for lightning protection on top of the fiber stack and tentatively fastening the electrically conductive mesh to the fiber stack using the first binder; and
    attaching an additional sheet-form binder that is different from the first binder between the fiber-stack and the electrically conductive mesh and tentatively fastening the fiber-stack to the electrically conductive mesh via the additional sheet-form binder; forming a dry preform that has a shaped configuration, the forming the dry preform including:
        placing the stack in a region surrounded by a mold and a bagging film that is attached to the mold; and
        depressurizing the region for pressing and pressurizing the stack against the mold while heating the stack in a state where the fiber stack contacts the mold and the electrically conductive mesh is placed between the fiber stack and the bagging film so that the first binder maintains the shaped configuration of the dry preform after the depressurizing of the region,
    wherein the additional sheet-form binder comprises a thermoplastic binder, and
    wherein the electrically conductive mesh is fixed to the fiber stack by thermally fusing the thermoplastic binder at equidistantly spaced spots through a use of a heater.

2. The dry preform shaping method according to claim 1, wherein the dry preform is manufactured by pressing the fiber stack against the mold through use of an atmospheric pressure.

3. The dry preform shaping method according to claim 1, wherein the stack is formed on a flat jig.

4. The dry preform shaping method according to claim 1, wherein an edge of the bagging film is attached to the mold by a sealant so that the electrically conductive mesh and the fiber stack are sealed.

5. The dry preform shaping method according to claim 1, wherein the stack is formed on a jig, and
    wherein, during the manufacture of the dry preform, the fiber stack contacts the mold and the jig.

6. The dry preform shaping method according to claim 1, wherein the mold comprises a male mold.

7. The dry preform shaping method according to claim 1, wherein the sheet-form binder is a woven fabric material with a knitted fiber made of a thermoplastic resin or a nonwoven fabric formed from a fiber made of a thermoplastic resin.

8. A composite forming method comprising manufacturing a composite by impregnating the dry preform manufactured by the dry preform shaping method according to claim 1 with a resin and curing the resin.

9. A composite forming method comprising:
    molding a composite by a vacuum-assisted resin transfer molding method, the molding the composite including:
        placing the dry preform manufactured by the dry preform shaping method according to claim 1 in a region covered with another bagging film;
        impregnating the placed dry preform with a resin; and
        curing the resin.

10. A dry preform shaping method comprising:
    forming a stack, the forming the stack including:
        forming a fiber stack by stacking sheet-form fibrous components to each of which a first binder is attached while tentatively fastening the sheet-form fibrous components with the first binder;
        stacking an electrically conductive mesh for lightning protection on top of the fiber stack and tentatively fastening the electrically conductive mesh to the fiber stack using the first binder; and
    attaching an additional sheet-form binder that is different from the first binder between the fiber-stack and the electrically conductive mesh and tentatively fastening the fiber-stack to the electrically conductive mesh via the additional sheet-form binder; forming a dry preform that has a shaped configuration, the forming the dry preform including:
        placing the stack in a region surrounded by a mold and a bagging film that is attached to the mold; and
    depressurizing the region for pressing and pressurizing the stack against the mold while heating the stack in a state where the fiber stack contacts the mold and the electrically conductive mesh is placed between the fiber stack and the bagging film so that the first binder maintains the shaped configuration of the dry preform after the depressurizing of the region,
    wherein the tentative fastening and the stacking of the sheet-form fibrous components are carried out automatically by using an automatic fiber stacking apparatus equipped with a heater for performing spot welding of the first binder, and
    wherein the tentative fastening of the electrically conductive mesh is carried out automatically by using a heating terminal of the heater provided on the automatic fiber stacking apparatus.

11. A dry preform shaping method comprising:
    forming a stack, the forming the stack including:
        forming a fiber stack by stacking sheet-form fibrous components to each of which a first binder is attached while tentatively fastening the sheet-form fibrous components with the first binder;
        stacking an electrically conductive mesh for lightning protection on top of the fiber stack and tentatively fastening the electrically conductive mesh to the fiber stack using the first binder; and
    attaching an additional sheet-form binder that is different from the first binder between the fiber-stack and the electrically conductive mesh and tentatively fastening the fiber-stack to the electrically conductive mesh via the additional sheet-form binder; forming a dry preform that has a shaped configuration, the forming the dry preform including:
placing the stack in a region surrounded by a mold and a bagging film that is attached to the mold; and
depressurizing the region for pressing and pressurizing the stack against the mold while heating the stack in a state where the fiber stack contacts the mold and the electrically conductive mesh is placed between the fiber stack and the bagging film so that the first binder maintains the shaped configuration of the dry preform after the depressurizing of the region,
wherein the sheet-form binder is a woven fabric material with a knitted fiber made of a thermoplastic resin or a nonwoven fabric formed from a fiber made of a thermoplastic resin,
wherein the tentative fastening and the stacking of the sheet-form fibrous components are carried out automatically by using an automatic fiber stacking apparatus equipped with a heater for performing spot welding of the first binder, and
wherein the tentative fastening of the electrically conductive mesh is carried out automatically by using a heating terminal of the heater provided on the automatic fiber stacking apparatus.

* * * * *